United States Patent [19]

deBenneville

[11] 3,948,821

[45] Apr. 6, 1976

[54] SOLID AMINO ACID PRODUCTS FOR POLYPEPTIDE SYNTHESIS AND METHOD OF MANUFACTURE THEREOF

[75] Inventor: Peter L. deBenneville, Philadelphia, Pa.

[73] Assignee: Rohm and Haas Company, Philadelphia, Pa.

[22] Filed: June 4, 1973

[21] Appl. No.: 366,883

Related U.S. Application Data

[63] Continuation-in-part of Ser. No. 770,797, Oct. 25, 1968, abandoned.

[52] U.S. Cl..... 260/2.5 B; 260/2.5 N; 260/112.5 R; 424/78; 424/177; 424/178
[51] Int. Cl.²............................................ C08J 9/16
[58] Field of Search............ 260/112.5, 2.5 R, 88.2 S

[56] References Cited
UNITED STATES PATENTS
3,173,892  3/1965  Kun ................................ 260/88.2 S

OTHER PUBLICATIONS

Merrifield, R. B., "Solid Phase Peptide Synthesis", J.A.C.S., Vol. 85 (1963), pp. 2149–2154.

Merrifield, R. B., "Solid Phase Peptide Synthesis", Endeavour Vol. 24 (1965), pp. 3–7.

*Primary Examiner*—Morton Foelak

[57] ABSTRACT

Macroreticular polystyrene resin having a surface area of at least 5 and preferably at least 50 square meters/gram and a majority of pores of at least 30 Angstroms diameter is utilized as a solid base support for polypeptide synthesis; linkage of the first amino acid of the peptide to said base being effected through chloromethylation of the base, blocking of the amine function of the acid and esterifying the amino acid with the chloride; the esterification being conducted in the presence of an inert high dielectric constant solvent most preferably acetonitrile. Preferably, the macroreticular solid base support is an aromatic hydrocarbon resin or polymer unsubstituted with nitro or bromo groups, such as the unsubstituted macroreticular polystyrene, above described.

5 Claims, No Drawings

SOLID AMINO ACID PRODUCTS FOR POLYPEPTIDE SYNTHESIS AND METHOD OF MANUFACTURE THEREOF

This application is a continuation-in-part application of my earlier filed and copending application, Ser. No. 770,797, filed Oct. 25, 1968, now abandoned and entitled "Solid Amino Acid Products For Polypeptide Synthesis and Method of Manufacture Thereof."

This invention relates to polypeptide synthesis and more particularly to both a polymeric substrate and process condition for such synthesis. Specifically, this invention is directed to the novel use of specific resin forms to which amino acids are linked during polypeptide formation and to unique solvent systems for use during the initial linkage reaction.

Polypeptides, constituted by a chain of amino acids, are one of the most abundant and important classes of chemical compounds. Considerable research effort has been directed thereto, since polypeptides, in increasing numbers, have been found to exert hormonal functions, as in the case of insulin, and since they are the major constituents of enzymes, blood proteins, and many other substances essential to the living organism. Despite the ease with which the living cell synthesizes specific polypeptides, the intricate process presents substantial difficulties for the chemist. Of these, one of the most vexing is the necessity for complex purification steps at each stage of the step-by-step combination of amino acids which constitutes the synthesis, since the presence of fragments resulting from incomplete reaction, of other reagents used in the synthesis, and of by-products, leads to ever-increasing adulteration. Since, these reactions are carried out in liquid phase, the separation complexities are substantially increased due to the similarity of by-product properties to those of the desired peptide rendering conventional separation techniques such as crystallization extremely difficult.

In 1963 a major breakthrough in polypeptide production was reported by Dr. R. B. Merrifield (J. Am. Chem. Soc., 85, 2149 (1963)), (Biochemistry, 3, 1385 (1965)), the importance thereof being of such moment that other researchers in the field have designated his contribution the "Merrifield Synthesis." Briefly, Dr. Merrifield developed a solid phase polypeptide synthesis involving the reaction of a protected amino acid in the presence of triethylamine with either a nitrochloromethylated or chloromethylated gel copolymer of styrene cross-linked with 2% divinyl benzene. The amino acid was protected by an N-carbobenzoxy or t-butoxycarbonyl group which insured linkage of the amino acid to the copolymer through the carboxyl function, the latter reacting with the terminal chlorine. (The triethylamine absorbs the HCl product):

where Res. represents the resin base; Z the protecting group on the amino acid; and $R_1$ the remainder of the first amino acid molecule. After reaction the protecting group "Z" is removed and the next unit coupled thereto by well-known high yield methods:

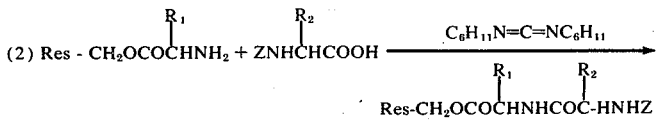

where $R_2$ represents the remainder of the second amino acid molecule. Again the Z is removed and a third Z blocked amino acid linked thereto by the identical technique.

This process is repeated until the desired polypeptide structure is obtained at which time the entire polypeptide is cleaved from the resin by ester hydrolysis techniques which do not affect the peptide linkages.

The preferred protecting group, Z, is t-butyloxycarbonyl (t-Boc). Where an amino acid contains both an α-amino group and an ε-amino group, as in lysine, t-Boc is used as the protecting group with the α-amino group and benzyl for the ε-amino group. In the successive esterification reactions dicyclohexylcarbodiimide is used to activate the amino group and methylene chloride is used as the reaction medium because of its action in swelling the cross-linked resin. The protecting group Z can be removed by HBr in acetic acid or HCl in dioxane with the hydrogen halogenide neutralized by triethylamine.

Provided the reaction has been in very high yield, the polypeptide can be easily purified. This is accomplished by the use of excesses of reactants whose removal would offer difficulty in the usual homogeneous medium, but which are easily removed in this system because of the ease of washing permitted by the presence of the polypeptide on the solid resin particles.

The entire Merrifield Synthesis was quite recently described by Dr. Merrifield in Scientific American, pages 56–75 (1968), wherein he also disclosed an apparatus used for automating the synthesis to simplify the mechanical problems involved in producing relatively long-chain polypeptide such as insulin.

There are a number of peptides of importance which range from three to about twenty amino acid units, the synthesis of which fall particularly well within the capability of the Merrifield technique. Many of these are known to possess antibiotic or hormone properties as summarized in a chapter of the H. D. Law text "Progress in Medicinal Chemistry," Vol. 4, pages 86–170 (Ellis and West, Editors), and in the S. Whaley article in "Advances in Protein Chemistry", 21, pages 1–112 (1966). Besides these recognized structures the Merrifield technique may be applied to the production of analogous structures wherein the amino acids are altered, in all types of permutations, whereby the activity of the resultant peptide is substantially modified.

The resin utilized in the Merrifield synthesis is prepared from a loosely cross-linked polystyrene-divinylbenzene resin (2% DVB) which is of fine mesh size (200–400 mesh-US sieve) to provide maximum surface (in the order of 1/10 square meter/gram) and minimum gel thickness. The polypeptide forms both within the gel and on the surface and in order to insure that full polypeptide growth may occur in both areas, the resin may only be lightly chloromethylated. If the resin is more highly chloromethylated, to give higher combining power to the substrate, the gel, because of its low porosity, is unable to accommodate the larger amounts of foreign substance, the reaction rate decreases and the resin particle may even be fragmented. It has been proposed to increase the mesh size of the resin (i.e., decrease the particle size) to provide a larger external surface for the polypeptide growth, but the 200–400 mesh utilized by Merrifield was found difficult to handle and increases in the fineness merely increased this difficulty. With the resin used by Merrifield, the maximum chloromethylation has been about 1.5 milliequivalents of chlorine per gram of resin with most chloromethylation occurring in the order of about 0.6 milliequivalents per gram. Even with this light degree of chloromethylation, it has not been possible to obtain a high initial esterification when the blocked amino acid in ethanol solvent is reacted with the resin base. Yields in the order of about 30–35% have been the highest obtained so that the final product contained only about 0.3 to 0.5 millimoles of amino acid per gram of resin even with the highest degrees of chloromethylation. It has now been found that the solvent plays an important role in this type of esterification. Ethanol, although suited for carrying the amino acid, was apparently interfering with the reaction between the amino acid and the resin. This was confirmed by analysis of the filtrate for chloride produced in the Merrifield synthesis after initial esterification, it being observed that a large discrepancy existed between the amount of chloride therein and that which should be theoretically present based on the amount of amino acid on the resin.

Thus, the Merrifield technique, although a major advance, has been found to possess certain deficiencies in capacity, ease of handling and yield potential.

It is an object of this invention to provide an improved process for carrying out the Merrifield synthesis which allows, at the same time, the maintenance of large bead size with corresponding easy handling, without sacrifice of high surface area and high porosity.

It is another object to provide a method for synthesizing polypeptides using resin beads of about 100 mesh or larger giving at least about 1 millimole of bound amino acid per gram of resin.

Again, it is an object of the invention to provide a process for reacting a chloromethylated resin bead and a suitably blocked amino acid to give the resulting ester in a yield of 50% or better.

These and other objects are accomplished in accordance with the instant invention by utilizing macroreticular crosslinked polystyrene beads as the resin base in the Merrifield synthesis and initially esterifying the chloromethylated resin with blocked amino acid in the presence of a highly polar solvent whose dielectric constant is greater than 35 at 20°C. Preferably, the macroreticular solid base support initially used is an aromatic hydrocarbon resin or polymer unsubstituted with nitro or bromo groups (or any other groups except for alkyl such as ethyl substitution which derives from ethyl vinyl benzene which is usually associated with commercial divinylbenzene such as the macroreticular crosslinked unsubstituted polystyrene noted above.

Macroreticular beads are prepared in the same manner as the regular suspension-polymerized gel-type beads of the prior art, except that the polymerization is carried out in the presence of a suitable solvent. The process of preparing macroreticular resin beads, including description of solvents, monomers and process conditions, are set forth, inter alia, in U.S. Pat. No. 3,322,695 to Alfrey et al.; U.S. Pat. No. 3,147,214 to Kressman et al.; U.S. Pat. No. 3,326,875 to Moore; and the British Pat. Nos. 932,125–6 both to Rohm and Haas Company, the disclosures of which are incorporated herein by reference thereto. Suitable solvents for the monomer which may be swelling or non-swelling with respect to the polymer are, for example, aliphatic hydrocarbons, alcohols, ketones, aromatic hydrocarbons and halogen or ether derivatives of these substances. Frequently, a mixture of two or more solvents is desirable.

The monomers must be selected so as to provide the requisite sites for chloromethylation together with the desired degree of crosslinking as is known to those skilled in the art. Thus, the monomers may be one or more alkenyl aromatic monomers plus a suitable crosslinker and minor amounts of one or more modifying monomers. By reason of their ready availability preferred alkenyl aromatic monomers are styrene, ethyl styrene and vinyl toluene. Where the crosslinker is itself an alkenyl aromatic monomer, as divinylbenzene, no comonomers need be used. Other crosslinkers which may be used in admixture with one or more alkenyl aromatic monomers are trivinylbenzene, glycol dimethacrylate, trimethylolpropane trimethacrylate, divinoxyethane, etc. Preferred modifying monomers are vinyl chloride, vinylidene chloride, acrylonitrile and methyl methacrylate. The minimum amount of crosslinker to be used depends on the comonomers, the solvent and the properties desired in the product. The maximum amount is determined by economic factors (the crosslinker is generally the most expensive monomer in the copolymer) and by the necessity of having sufficient aromatic rings present for chloromethylation (a factor which does not apply to divinylbenzene). In general about 8–35% based on the weight of the monomer mixture may be used although the amount may vary in suitable cases to as little as 2% and up to 50% for most crosslinkers and up to 100% for divinylbenzene (all percentages are by weight).

The organic reactants (i.e., monomers, solvent and catalyst) are agitated in a water system to form a dispersion having the desired particle size with heat applied to aid polymerization. The resulting beads are translucent to opaque, and are characterized by the presence of pores and a measurable surface area which may reach 2000 square meters per gram of resin. In contrast to the conventional polystyrene gel beads, such as those proposed for use by Merrifield, the macroreticular beads useful in the present invention may be prepared with very high ratios of DVB, up to 95% or even 100%. A very useful range for preparing materials with good physical characteristics and sufficient surface area comprises the use of 3–50% DVB and 20–80% of solvent extender calculated on the total organic phase. These ratios are in part determined by the nature of the extender. Since commercial DVB contains from 40 to 50% of meta and para-ethylstyrene, the polymer, strictly speaking, is usually a terpolymer of styrene, ethylstyrene and DVB. The ethylstyrene component can be largely avoided by the use of 96% DVB, but it is usually acceptable as a constituent of the polymer. Commercial DVB can, as a matter of fact, be used alone to give a DVB-ethylstyrene copolymer, containing 60% DVB crosslinker, which is suitable for the purpose of this invention. Small amounts of other monomer such as acrylonitrile or methyl methacrylate can be added if desired.

Macroreticular type polymers have been described in many publications and patents, the manufacture thereof being well known to the art and forming no part of the instant invention. For example, the Alfrey et al. U.S. Pat. No. 3,226,695, issued May 30, 1967, fully describes the preparation of macroreticular resins of styrene as described above, while commercial formulations are available.

Examination of a cross-section of a typical macroreticular bead, with the electron microscope, shows it to consist of a flexible gel continuum with numerous relatively large holes, in which are embedded small spheres on the order of a micron or less in diameter. It is this type of structure which gives the very high surface and porosity which enables it to accommodate with some swelling the large amounts of foreign substances. The macroreticular beads vary in diameter over a wide range and are separated by conventional screening techniques. For the instant invention it has been found most advantageous to utilize particles varying between about 18 and about 100 mesh (US Sieve) and most preferably between 18 and 60 mesh. This latter range of particle sizes may be maximized by controlling the stirring speed (agitation) during the polymerization. Such sizes are well suited for the numerous mechanical manipulations in the steps by polypeptide preparation and purification. The surface area of the beads for this invention contain at least 5 square meters/gram and preferably at least 50 square meters/gram. The porosity (% volume of pores in the resin body or bodies) of the beads is at least 10% and preferably varies between 30 and 75 volume percent with a majority of pores being of a diameter greater than 30 Angstroms.

The macroreticular beads may be chloromethylated by the same methods which are used for the chloromethylation of the merrifield gel resins, for example, by reaction with chloromethyl methyl ether in the presence of catalysts such as stannic chloride, aluminum chloride, zinc chloride and the like. Other techniques such as those disclosed in U.S. Pat. Nos. 3,297,648 and 3,311,602 may also be utilized.

The following is a specific example of the preparation and chloromethylation of a macroreticular polymer of the instant invention:

EXAMPLE I

Preparation of Resin Formulation A

A mixture of 96 grams styrene, 64 grams containing 50% active ingredient technical divinylbenzene (50% divinylbenzene — 50% ethyl styrene); 87 grams tertiary Rohm ethanaol, and gran amyl alcohol and 1 gram benzoyl peroxide is charged to a solution of sodium chloride (6.5 grams) and the ammonium salt of a commercial styrene - maleic anhydride copolymer (Amberlite W-1, Rphm and Haas Co., .5 gram) in 174 grams of water. The mixture is agitated until the organic components are dispersed as fine droplets, and it is then heated to 86° to 88° for 6 hours. The resulting polymer pearls are filtered, washed with water, and then ethanol,and finally freed from excess water, ethanol and tertiary amyl alcohol by drying at 100°. The product is obtained in the form of white opaque spherical or spheroidal particles amounting to 145 grams. The surface area is about 90 square meters per ram with an average pore diameter of 200 Angstroms.

This copolymer may be screened if desired to separate the particles falling between 18 and 100 mesh (US Sieve), which are particularly suitable to handle in the subsequent preparations. Even the smallest beads, however, are of macroreticular structure, and are useful in the preparation aside from somewhat less favorable handling qualities. If the stirring speed is properly chosen, over 80% of the beads will fall in a 18 to 60 mesh size which is particularly desirable for mechanical operations in the further steps of polypeptide preparation.

Chloromethylation of Formulation A

One hundred grams of an 18-100 mesh cut of the polymer beads is soaked in one liter of ethylene dichloride overnight. To this is added 150 grams of chloromethyl methyl ether, and the stirred mixture is heated to 35°. Eight portions of 2.5 ml. each of stannic chloride are added at 10 minute intervals while stirring and maintaining the temperature at 40°. The mixture is subsequently heated and stirred at this temperature for 5 hours. The resin is filtered from the liquid phase and washed on the filter with several 200 ml. portions of dioxane, then with 75% dioxane in water, 75% dioxane in 2 N hydrochloric acid, deionized water, 4% sodium hydroxide, and then water until neutral. Finally, the resin is washed with one liter of methanol, sucked dry, and is then further dried in vacuo at 80°. There is thus obtained 120 grams of chloromethylated resin which contains by analysis, 10% Cl.

The degree of chloromethylation can be controlled by the temperature of reaction, the quantity of chloromethyl methyl ether, and the solvent used. Suitable solvents are non-reactive liquids such as chlorinated hydrocarbons, ethers or chlorinated ethers, nitro compounds and the like.

By the method of Example I, other macroreticular chloromethylated polymer beads are prepared (Table I below) having varying degrees of chloromethylation, up to 21% (6 milliequivalents) of chlorine, in particle sizes ranging from 18 to 100 mesh, with at least 80% in the 18 to 60 mesh range:

TABLE I

| | | | | Chloromethylated Macroreticular Substrates | | | | | |
|---|---|---|---|---|---|---|---|---|---|
| | | Divinyl- | Ethyl- | | | | | Chlorine | |
| | Styrene | benzene | Styrene | | | | | | |
| Formulation | % | % | % | Solvent 1 | a% | Solvent 2 | a% | % | meq/g. |
| A | 60 | 20 | 20 | t-amyl alcohol | 35 | none | — | 10.0 | 2.82 |
| B | 50 | 30 | 20 | hexan-2-ol | 35 | none | — | 8.4 | 2.40 |
| C | 95 | 3 | 2 | 4-methylpentan-2-ol | 43 | none | — | 19.8 | 5.59 |
| D | 50 | 30 | 20 | kerosene | 46 | toluene | 24 | 4.86 | 1.36 |
| E | 92 | 5 | 3 | methyl ethyl ketone | 33 | toluene | 33 | 21.3 | 5.91 |
| F | 25 | 45 | 30 | octane | 33 | toluene | 33 | 6.0 | 1.69 |
| G | 17 | 50 | 33 | 4-methylpentan-2-ol | 33 | none | — | 8.7 | 2.45 |
| H | 50 | 30 | 20 | kerosene | 37 | ortho di-chlorobenzene | 37 | 9.5 | 2.68 |

TABLE I-continued

| Formulation | Styrene % | Divinyl-benzene % | Chloromethylated Macroreticular Substrates Ethyl-Styrene % | Solvent 1 | a% | Solvent 2 | a% | Chlorine % | mea/g. |
|---|---|---|---|---|---|---|---|---|---|
| I | 50 | 30 | 20 | kerosene | 37 | toluene | 37 | 19.5 | 5.5 |
| J | 75 | 25 | 0 | ethylhexanol | 24 | diethylbenzene | 36 | 12.0 | 3.4 | a% of total organic phase (monomer + solvent)

TABLE II

| Formulation | Physical Properties of Macroreticular Resins Before Methylchlorination Surface Area Sq. Met. per Gram | Porosity Volume % | Pore Size |
|---|---|---|---|
| A | 90 | — | Avg. 220 Angstroms |
| C | 10 | 67 | — |
| D | 270 | 61 | 1000–10,000 Ang. 36% 100–1000 — 48% less than 100 — 16% |
| G | 300 | 47 | Avg. 90 Angstroms. |
| H | 200 | 43 | 100–10,000 Ang. 9% 100–1000 Ang. —79% less than 100—12% |

Each of the above formulations are suitable for the Merrifield synthesis providing ease of handling with a broad range of potential reaction sites. In certain instances, for example, formulations D & F, only light chloromethylation is practiced in order to obtain samples directly comparable to the base used by Merrifield in his research efforts. The degree of chloromethylation will generally be varied to provide between 1 and 6 milliequivalents of chlorine per gram of resin.

As described above, each of the formulations of Table I is suitable for use in the Merrifield synthesis, i.e., is capable of amino acid esterification through the chloride. To form the ester of the first amino acid unit, it is necessary first to protect the amino function of the acid. This is suitably done by methods which have been used in the prior art, of which the best is the formation of a t-butoxycarbonyl (t-Boc) derivative of the structure

$$(CH_3)_3COCNHCHCOOH$$

where R represents the remainder of the amino acid molecule. A mixture is made of the resin, one equivalent or more of triethylamine, and an amount of t-Boc-amino acid equivalent to the triethylamine in a suitable solvent for reaction. The prior art has used ethanol or ethyl acetate for a solvent in this reaction, to give yields of the t-Boc aminoester of the resin which are at best about 35% as previously noted.

Utilizing this technique with ethanol as the solvent, the following experiment was conducted to compare the use of the chloromethylated large size particles of the instant invention to the results reported by Merrifield.

EXAMPLE II

A mixture of 1 gram (1.36 milliequivalents) of resin beads of Formulation D in Table I, 0.274 gram (1.45 millimoles) of T-Boc-L-alanine, 0.147 gram of triethylamine and 20 milliliters of ethanol is refluxed for 24 hours with stirring. The resulting beads, after washing with ethanol and drying, weighed 1.042 grams. A sample was hydrolyzed by refluxing in a 1.1 mixture of dioxane and concentrated hydrochloric acid for 24 hours. Analysis for alanine by the ninhydrin method showed a content of 0.43 millimoles of alanine. The starting resin contained 1.36 milliequivalents of chlorine, so that the yield was 32%.

This is the normal yield in the Merrifield technique using ethanol or ethyl acetate as solvent with conventional gel resin.

In view of the consistency of relatively low yields obtained with both Merrifield's and the instant invention bases, analysis of the filtrate was undertaken and it was discovered that a large discrepancy existed in the amount of chloride in the filtrate and the amount of amino acid on the resin, although theoretically they should have been molecularly equal. In order to determine the cause of this disparity formulations C and D were subjected, inter alia, to reflux boiling with ethanol for extended periods. At 24 hours a significant amount of chloride was found in the filtrate, increasing at 6 hour test intervals thereafter. After 38 hours Formulation C had lost 0.50 millimoles of chloride per gram and Formulation D had lost 0.96 millimoles of chloride per gram. From this it was concluded that a slow side reaction between the chloromethylated resin and the solvent ethanol was occurring during the esterification, the continuity of this reaction being evidenced by the constant quantity of chloride coming out under the reflux boiling condition. In order to minimize this problem and thereby increase the yields, the use of ethanol and ethyl acetate was eliminated and an inert solvent substituted therefor. It was found that inert solvents having a dielectric constant greater than 35 at 20°C., for example, acetonitrile, acetamide, dimethylformamide, dimethylacetamide, and nitromethane, are most satisfactory. Of these solvents acetonitrile is preferred, since its boiling point of 82°C. is in a most satisfactory range for carrying out reflux reactions. With this solvent at reflux there is minimal loss of chloride function of the chloromethylated resin base with esterification yields of at least 50% or better obtained. This yield may be consistently increased even over this amount when about 1.5 equivalents of the t-Boc amino acid and triethylamine are present based on the amount of chloride. The nature of the amino acid to be esterified onto the base (t-Boc form) does not affect the degree of reaction, alanine, valine and phenylalanine, each providing about the same yield. The following examples delineate the effects of acetonitrile solvent, excess amino acid reactants or excess chloromethylated resin in the esterification reaction.

EXAMPLE III

Use of Acctonitrile As A Solvent in Esterification

A mixture of 1 gram (2.68 milliequivalents) of resin beads of Formulation H in Table I, 0.71 gram (2.68 millimoles) of t-Boc-L-phenylalanine, 0.27 gram triethylamine and 20 milliliters of acetonitrile is refluxed for 24 hours with stirring. The reaction is filtered. The resulting beads, after washing with ethanol, weighed 1.350 grams. Analysis of the filtrate for chloride ion, and of a sample of the resin for phenylalanine shows that the total recovered resin contains 1.62 millimoles of phenylalanine corresponding to a 60% yield of ester. An examination of the infrared spectrum of the resin, in the form of a K Br disc, shows a strong carbonyl peak at 1730 cm$^{-1}$, corresponding to the ester function.

In a similar fashion, yields of 60 to 80% are obtained when a mixture of the chloromethylated bead, T-Boc-L-phenylalanine and triethylamine is heated at temperatures between 75° and 100° in, respectfully, dimethylformamide, nitromethane, dimethylacetamide and acetamide. These solvents are also easily removed by washing the beads with water or ethanol.

EXAMPLE IV

Combined Effects of Acetonitrile Solvent and Excess of Protected Amino Acid

A mixture of 1 gram (2.40 milliequivalents) of resin beads of Formulation B in Table I, 0.68 gram (3.6 millimoles) of t-Boc-L-alanine, 0.36 gram (3.6 millimoles) of triethylamine and 20 milliliters of acetonitrile is refluxed for 24 hours with stirring. The mixture is filtered to yield 1.27 grams of reacted resin beads. Analysis of these beads for alanine shows a total recovery of 1.67 millimoles of alanine reacted into the bead. This corresponds to a 70% yield of t-Boc-L-alanine ester.

This example shows the slight improvement obtained when an excess of protected amino acid and of tertiary amine is used. Under these conditions, the use of ethanol or ethyl acetate may give up to about 40% yield, and the use of nitromethane, acetamide, dimethylacetamide or dimethylformamide as solvent at 80° gives roughly the same yields as with acetonitrile, that is, 60 to 70%.

EXAMPLE V

Effect of Excess Chloromethylated Resin With Ethanol Solvent

A mixture of 1 gram (5.59 milliequivalents) of resin beads of Formulation C, 0.274 gram (1.45 millimoles) of t-Boc-l-alanine, 0.147 gram (1.45 millimoles) of triethylamine and 20 milliliters of ethanol is refluxed for 24 hours with stirring. The resulting beads, 1.143 grams, are filtered, dried and analyzed. The recovery of alanine, 0.8 millimoles, corresponds to 55% yield based on the starting t-Boc-L-alanine. This shows that the yield in ethanol is lower than that obtained in acetonitrile, even if the chloromethylated resin is in over 3-fold excess of the other reagents. The use of such large excesses of chloromethylated resin is undesirable because of bulk and expense, and because side reactions of the excess halogen introduce undesirable functionality.

EXAMPLE VI

Effect of Excess Blocked Amino Acid L-Alanine With Acetonitrile Solvent

A mixture of 1 gram (5.59 milliequivalents) of resin beads of Formulation C, 1.36 gram (7.5 millimoles) of t-Boc-L-alanine, 0.76 gram (7.5 millimoles) of triethylamine, and 20 milliliters of acetonitrile is refluxed for 24 hours. The mixture is filtered, and the beads washed with ethanol, to give 1.688 grams of reacted chloromethylated bead. Analysis for L-alanine shows a recovery in the beads of 4.8 millimoles, corresponding to a yield of 86% of combined alanine.

EXAMPLE VII

Effect of Excess Blocked Amino Acid L-Valine With Acetonitrile As Solvent

A mixture of 1 gram (2.68 milliequivalents) of resin beads of Formulation H, 0.78 gram (3.6 millimoles) of t-Boc-L-valine, 0.365 gram (3.6 millimoles) of triethylamine, and 20 milliliters of acetonitrile is refluxed for 24 hours, and the mixture worked up as in the previous examples. Analysis shows a recovery of 1.66 millimoles (70%) of combined valine in the 1.265 grams of beads. This is comparable to the results with alanine and phenylalanine.

It is seen from the preceding examples that conversion of the chloromethylated macroreticular bead to the ester is at least as high by the methods of the prior art as in the case of the conventional bead, in spite of the 10–20 fold larger diameter, and that this conversion can be more than doubled by the new conditions outlined in the examples. Furthermore, the beads are mechanically stable, and resist powdering and other breakdown during filtration, stirring and other operations required in the ester formation.

It will usually be desirable to start with a much higher amount of esterified amino acid per gram of resin bead for the subsequent polypeptide synthesis than has been used in the prior art. For the 2% DVB-styrene gel resin taught by Merrifield, this has varied from about 0.2 to 0.5 millimoles of amino acid per gram of resin. In the process of the invention from 1 to 4 millimoles of amino acid per gram of resin can normally be used for most polypeptides of interest, which are in the range of 3 to 20 amino acid units. For polypeptides of molecular weight above 2000, a lesser degree of functionality is desirable. This is best achieved by limiting the amount of chloromethylation.

To make the polypeptide, the protecting group is first removed, and subsequent amino acid units are added by the methods of the prior art. In our experience, these reactions proceed just as well as in the gel resins of the prior art. The large beads maintain their integrity and are easily handled in filtration and transfer operations, and they will easily accommodate several times their own weight and more of the polypeptide with no visible change other than swelling to a larger diameter. Thus, the higher original capacity of the bead obtained by a higher degree of chloromethylation is realizable in the final polypeptide.

Since the actual polypeptide synthesis after the initial esterification has been fully disclosed by Merrifield, detailed examples thereof are not included herein. With the chloromethylated resin bases of the instant invention the following polypeptide systems have been produced and cleaved from the resin base in the manner taught by Merrifield.

Dipeptides:
  L-alanyl-L-phenyl alanine
Tetrapeptides:
  L-phenylalanyl-L-alanyl-L-phenylalanyl-L-alanine
  L-alanyl-L-phenylalanyl-L-alanyl-L-phenylalanine
  L-leucyl-L-alanyl-glycyl-L-valine
Nonapeptides:
  (L-phenylalanyl)$_2$ (L-alanyl)$_6$L-alanine Various changes and modifications may be made practicing the invention without departing from the spirit and scope thereof and therefore this invention is not to be limited except as defined in the appended claims.

What is claimed is:

1. A solid phase crosslinked aromatic hydrocarbon macroreticular resin or polymer unsubstituted with nitro or bromo groups and containing at least 50% by weight alkenyl aromatic monomer units, said resin containing —CH$_2$— groups added by chloromethylation and having amino acid units linked to at least 50% of said —CH$_2$— groups by means of an esterification reaction carried out in the presence of an inert solvent having a dielectric constant greater than 35 at 20°C., said resin having a majority of pores of at least 30 Angstroms diameter and a surface area in the dried state of at least 5 square meters per gram, said amino acid being linked to said resin through a methylene group to the carboxyl function of said amino acids in accordance with the formula

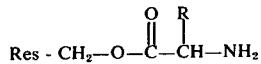

wherein Res is the macroreticular resin or polymer base and R is the remainder of the amino acid.

2. A product according to claim 1 wherein the alkenyl aromatic monomer is selected from the group consisting of styrene, ethyl styrene, vinyl toluene, and divinylbenzene, and mixtures thereof.

3. A product according to claim 1 wherein said chloromethylation shall have provided from 1 to 6 milliequivalents of chlorine per gram of resin.

4. A product according to claim 1 wherein said macroreticular polymer has a mesh size of between about 18 and about 60.

5. A product according to claim 1 wherein said macroreticular polymer has a porosity of between about 30 and about 75 volume per cent and a surface area of at least about 50 square meters per gram.

* * * * *